(12) United States Patent
Kilgard

(10) Patent No.: US 8,149,243 B1
(45) Date of Patent: Apr. 3, 2012

(54) 3D GRAPHICS API EXTENSION FOR A PACKED FLOAT IMAGE FORMAT

(75) Inventor: Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 675 days.

(21) Appl. No.: 11/565,993

(22) Filed: Dec. 1, 2006

Related U.S. Application Data

(60) Provisional application No. 60/833,978, filed on Jul. 28, 2006.

(51) Int. Cl.
*G06T 1/60* (2006.01)

(52) U.S. Cl. ........................................... 345/530

(58) Field of Classification Search .................. None
See application file for complete search history.

(56) References Cited

U.S. PATENT DOCUMENTS

| | | | |
|---|---|---|---|
| 5,005,137 A | 4/1991 | Ernst | |
| 5,392,393 A * | 2/1995 | Deering | 345/505 |
| 5,632,005 A | 5/1997 | Davis et al. | |
| 5,666,537 A * | 9/1997 | Debnath et al. | 713/322 |
| 5,812,854 A | 9/1998 | Steinmetz et al. | |
| 5,819,017 A * | 10/1998 | Akeley et al. | 345/422 |
| 5,870,097 A | 2/1999 | Snyder et al. | |
| 5,884,057 A * | 3/1999 | Blomgren et al. | 712/204 |
| 5,977,977 A | 11/1999 | Kajiya et al. | |
| 5,995,122 A * | 11/1999 | Hsieh et al. | 345/561 |
| 6,028,893 A | 2/2000 | Schreib | |
| 6,044,225 A | 3/2000 | Spencer et al. | |
| 6,247,116 B1 * | 6/2001 | Abdallah et al. | 712/221 |
| 6,650,327 B1 * | 11/2003 | Airey et al. | 345/520 |
| 6,751,725 B2 * | 6/2004 | Bistry et al. | 712/221 |
| 6,891,544 B2 | 5/2005 | Oka et al. | |
| 6,982,718 B2 | 1/2006 | Kilgard et al. | |
| 6,983,456 B2 | 1/2006 | Poznanovic et al. | |
| 7,006,101 B1 | 2/2006 | Brown et al. | |
| 7,009,615 B1 | 3/2006 | Kilgard et al. | |
| 7,015,915 B1 | 3/2006 | Diard | |
| 2002/0032852 A1 * | 3/2002 | Ramirez et al. | 712/217 |
| 2002/0090141 A1 * | 7/2002 | Kenyon et al. | 382/239 |
| 2002/0176009 A1 * | 11/2002 | Johnson et al. | 348/229 |
| 2003/0014454 A1 * | 1/2003 | Steele, Jr. | 708/500 |
| 2003/0020741 A1 | 1/2003 | Boland et al. | |
| 2003/0033588 A1 * | 2/2003 | Alexander | 717/107 |
| 2003/0126176 A1 * | 7/2003 | Devir | 708/520 |

(Continued)

OTHER PUBLICATIONS

Office Action. U.S. Appl. No. 11/565,566 dated Jun. 9, 2009.

(Continued)

*Primary Examiner* — Andrew Wang
*Assistant Examiner* — David H Chu
(74) *Attorney, Agent, or Firm* — Patterson & Sheridan, LLP

(57) ABSTRACT

A three dimensional (3D) graphics applications programming interface (API) extension provides support for specifying images in a packed float format. In the packed float format, floating point values of three color components are represented as N bits, where N is less than the total number of bits required for a standard half-precision or full precision format. For example, the blue, green, and red components may each be encoded to have a 5-bit exponent and a 5- or 6-bit mantissa with an implied leading 1. The packed float format is used to represent high dynamic range textures in a compact encoding to reduce the memory footprint needed to store the image data compared with other high dynamic range formats.

22 Claims, 13 Drawing Sheets

U.S. PATENT DOCUMENTS

| | | |
|---|---|---|
| 2003/0164832 A1 | 9/2003 | Alcorn |
| 2004/0012596 A1 | 1/2004 | Allen et al. |
| 2004/0158693 A1 | 8/2004 | Dagan et al. |
| 2004/0169671 A1 | 9/2004 | Aronson et al. |
| 2005/0243094 A1 | 11/2005 | Patel et al. |
| 2006/0061584 A1* | 3/2006 | Kristiansen .................. 345/582 |
| 2006/0062233 A1* | 3/2006 | Brewer et al. ................ 370/412 |
| 2006/0104510 A1* | 5/2006 | Aharon et al. ................ 382/173 |
| 2006/0114260 A1 | 6/2006 | Diard |
| 2007/0258641 A1* | 11/2007 | Srinivasan et al. ............ 382/166 |
| 2008/0133246 A1 | 6/2008 | Fellers et al. |

OTHER PUBLICATIONS

Office Action. U.S. Appl. No. 11/559,545 dated Sep. 22, 2009.
Final Office Action dtd Mar. 29, 2010. U.S. Appl. No. 11/559,545.
Pyopengl, "glDrawPixel", http://pyopengl.sourceforge.net/documentation/manual/glDrawPixels.3G.html, Oct. 19, 2002.
Walter, "rgbe.c", May 26, 1995.
Office Action, U.S. Appl. No. 11/548,241 dtd. Jul. 23, 2010.
Office Action, U.S. Appl. No. 11/548,247 dtd. Jul. 23, 2010.

* cited by examiner

PRIOR ART

3D GRAPHICS API EXTENSION FOR A PACKED FLOAT IMAGE FORMAT

CROSS-REFERENCE TO RELATED APPLICATIONS

This application claims the benefit of U.S. provisional patent application Ser. No. 60/833,978, entitled, "API Extensions for Advanced Graphics Processing Units," filed Jul. 28, 2006, which is herein incorporated by reference.

BACKGROUND OF THE INVENTION

1. Field of the Invention

Embodiments of the present invention relate generally to a three dimensional (3D) graphics applications programming interface (API) extension, and more particularly to converting image data to and from a packed float format.

2. Description of the Related Art

Recently 3D graphics content developers are using high dynamic range color components to increase visual realism. An 8-bit per component fixed point format does not provide enough range and precision to represent the high dynamic range color components. A floating point format, typically 16 bits or 32 bits per component, provides the needed range and precision, but does not have a compact encoding compared with the fixed point format.

As the foregoing illustrates, what is needed in the art is the ability to represent high dynamic range values using a floating point format with compact encoding in order to store images in the same or less memory than fixed point format images. Furthermore, it is desirable to specify the high dynamic range format with compact encoding for use with graphics library operations that are provided by conventional APIs.

SUMMARY OF THE INVENTION

Embodiments of the present invention provide a 3D graphics API extension for specifying images in a packed float format to encode high dynamic range values. In the packed float format, floating point values of all three color components are represented as N bits, where N is less than the total number of bits required to represent all three color components using standard half-precision or full precision format. The packed float format is used to represent high dynamic range textures in a compact encoding to reduce the memory footprint needed to store the image data compared with other high dynamic range formats.

Image data is encoded to and decoded from the packed float format using a pixel processing pipeline. Image data encoded into the packed float format can be decoded and used as texture data during rendering. By using the 3D graphics API extension to specify a source or destination image format, image data may be encoded to and decoded from the packed float format without requiring a graphics application to perform the encoding or decoding. In particular, the packed float format may be specified for images that are processed using graphics library operations provided by the OpenGL architecture.

Various embodiments of the invention for providing image data represented in a packed float format for graphics processing include receiving source image data specified by an application program and a parameter that specifies the packed float format, processing the source image data using a pixel processing pipeline provided by function calls of a 3D graphics library to produce processed source image data, encoding the processed source image data into the packed float format to produce the image data represented in the packed float format, and transmitting the image data represented in the packed float format to a graphics memory for storage.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

A 3D graphics API extension provides support for specifying images in a packed float format. The packed float format is used to represent high dynamic range textures in a compact encoding. Consequently, the memory footprint needed to store the image data is reduced compared with other high dynamic range formats. Image data is encoded to and decoded from the packed float format using the pixel processing pipeline. Image data encoded into the packed float format can be decoded and used as texture data during rendering. Using the 3D graphics API extension to specify a source (external or internal) or destination (internal or external) image format, image data may be encoded to and decoded from the packed float format without requiring a graphics application to perform the encoding or decoding. The packed float format may be specified as a format parameter for the destination image data. The packed float format may also be specified as a format parameter for the source image data to allow the application to provide the source image data pre-encoded in the packed float format. Furthermore, the 3D graphics API extension enables the packed float format to be specified or returned for existing OpenGL function calls, such as glDrawPixels, glReadPixels, glTexImage1D, glTexImage2D, glGetTexImage, glTexImage3D, glTexSubImage1D, glTexSubImage2D, glTexSubImage3D, glCopyTexImage1D, glCopyTexImage2D, glRenderbufferStorageEXT, glGetHistogram, glGetMinmax, glConvolutionFilter1D, glConvolutionFilter2D, glConvolutionFilter3D, glGetConvolutionFilter, glSeparableFilter2D, glGetSeparableFilter, glColorTable, glColorSubTable, glGetColorTable, glGetIntegerv, glGetFloatv and glGetDoublev.

Figure 1:
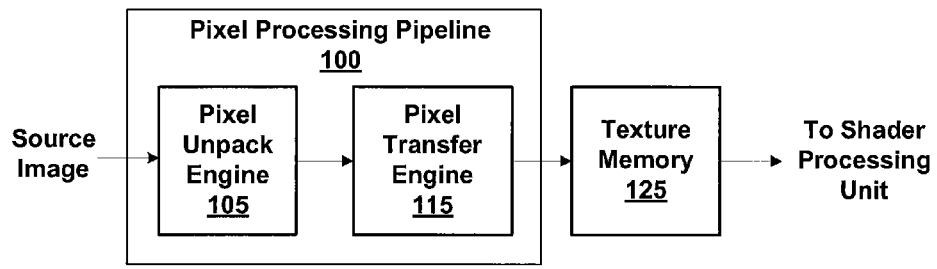
FIG. 1 is a block diagram illustrating a pixel processing pipeline in a conventional system.

FIG. 1 is a block diagram illustrating a conventional system including a pixel processing pipeline 100 defined by the current OpenGL architecture. Pixel processing pipeline 100 is used for specifying texture images, drawing pixels, copying pixels, blending pixels, and reading pixels. A source image for use as a texture map is received by a pixel unpack engine 105. Pixel unpack engine is configured using functions provided by the OpenGL graphics library to unpack the source image data words and produce an array of pixels including data representing one or more components for each pixel. Conventionally, the data may be represented in either a fixed-point format or a floating point format where each value is represented in 16 bits (in the case of half-precision) or 32 bits (in the case of full precision). A pixel transfer engine 115 is configured using functions provided by the OpenGL graphics library to perform scale, bias, convolution, color conversion operations on the data. The pixel data transmitted as texture data by pixel transfer engine 115 is stored in a texture memory 125 and is read by a shader processing unit, as needed, to perform shading operations. Texture memory 125 is conventionally embodied by a storage resource such as dynamic random access memory (DRAM). Pixel unpack engine 105 and pixel transfer engine 115 may each be embodied as software or as hardware configured to perform the OpenGL function calls.

The present invention provides an API extension to OpenGL that allows data representing pixel or texture components to be specified, encoded to, and decoded from a packed float format that allows three floating point values to be encoded into 32 bits. The packed float format is compact compared with conventional half-precision or full precision formats. Therefore, the amount of memory needed to store the data in a texture memory or frame buffer memory is reduced. When using the present invention, three floating point precision components may be represented in 32 bits, whereas a conventional half-precision format requires 48 bits and a conventional full precision format requires 96 bits.

In one embodiment of the packed float format, a blue image component is encoded as a 5-bit exponent and a 5-bit mantissa with an implied leading 1; a green image component is encoded as a 5-bit exponent and a 6-bit mantissa with an implied leading 1; and a red image component is encoded as a 5-bit exponent and a 6-bit mantissa with an implied leading 1. One advantage of using a 5-bit exponent rather than an 8-bit exponent is that the 5-bit exponent allows for more bits to be allocated to the mantissa while fitting three components into a 32-bit word. Having extra precision for each component is advantageous in situations where a high magnitude component dominates a low magnitude component. Furthermore, graphics processors that are configured to process a conventional half-precision floating point format with a 5-bit exponent for each component may utilize existing filtering units for textures represented in the packed float format.

In the packed float format described above, any component with all zeros for its exponent and mantissa is defined as zero even though a leading one is implied for the mantissa. Further, any component with all ones for its exponent and all zeros for its mantissa is defined as "Infinity," and any component with all ones for its exponent and at least one non-zero bit in its mantissa is defined as "Not a Number" (NaN). Also, an exponent bias of 15 is used, such that the exponent value ranges from −15 to 15.

The maximum blue component value that can be represented in the packed float format is $2^{15} \times (1+31/32)$. The maximum green or red component value that can be represented in the packed float format is $2^{15} \times (1+63/64)$. Any component that has a value greater than the maximum value for that component is "clamped" to the maximum value.

The minimum non-zero blue component value that can be represented in the packed float format is $2^{-15} \times (1+1/32)$. The minimum non-zero green or red component value that can be represented in the packed float format is $2^{-15} \times (1+1/64)$. Any component that has a value that is negative, or less than the minimum value for that component, is "clamped" to zero.

Figure 2A:
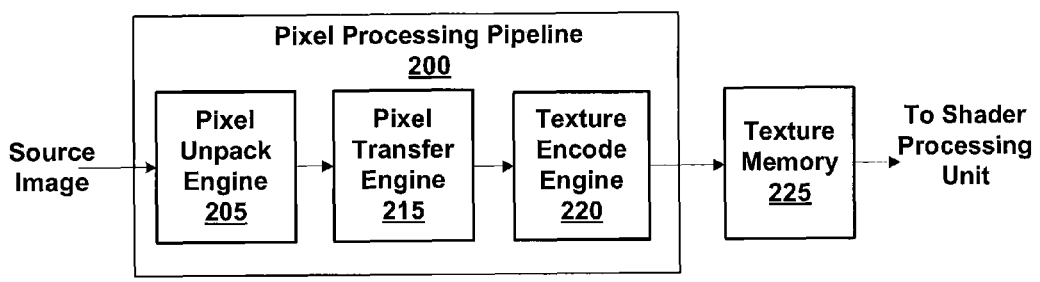
FIG. 2A is a block diagram illustrating a pixel processing pipeline including an encoding engine in accordance with one embodiment of the present invention.

FIG. 2A is a block diagram illustrating a pixel processing pipeline 200 including a texture encode engine 220, in accordance with one embodiment of the present invention. A pixel unpack engine 205 and a pixel transfer engine 215 perform the functions of previously described pixel unpack engine 105 and pixel transfer engine 115, respectively. Texture encode engine 220 is provided by the 3D graphics API extension and is used to encode and pack component values that represent texture map components into the packed float format. In the preferred embodiment of the present invention, the 3D graphics API extension is an extension of the OpenGL API that is accepted as a format parameter for existing OpenGL function calls.

Figure 2B:
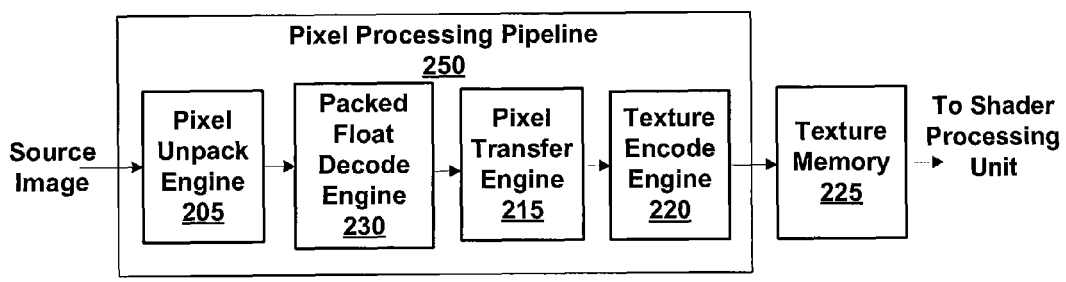
FIG. 2B is a block diagram illustrating another pixel processing pipeline including a decoding engine in accordance with one embodiment of the present invention.

FIG. 2B is a block diagram illustrating a pixel processing pipeline 250 including a packed float decode engine 230, in accordance with one embodiment of the present invention. Packed float decode engine 230 is provided by the 3D graphics API extension and is used to decode component values represented in the packed float format after the unpacking of pixel components by pixel unpack engine 205 and prior to processing by pixel transfer engine 215. The inclusion of packed float decode engine 230 in pixel processing pipeline 250 allows an application to specify a source image that is represented in the packed float format and to process that source image using the conventional functions provided by pixel transfer engine 215. Therefore, compatibility with existing pixel processing functionality defined by the OpenGL specification is maintained.

The pixel unpack engine 205 and a pixel transfer engine 215 of pixel processing pipelines 200 and 250 may be embodied as a software program or as circuitry designed to execute specific function calls for pixel processing defined by the OpenGL specification and provided in the form of a 3D graphics library. Similarly, texture encode engine 220 and packed float decode engine 230 may be embodied as a software program or as circuitry designed to execute functions for specifying and processing source image data to/from the packed float format defined by the 3D graphics API extension.

Figure 3A:
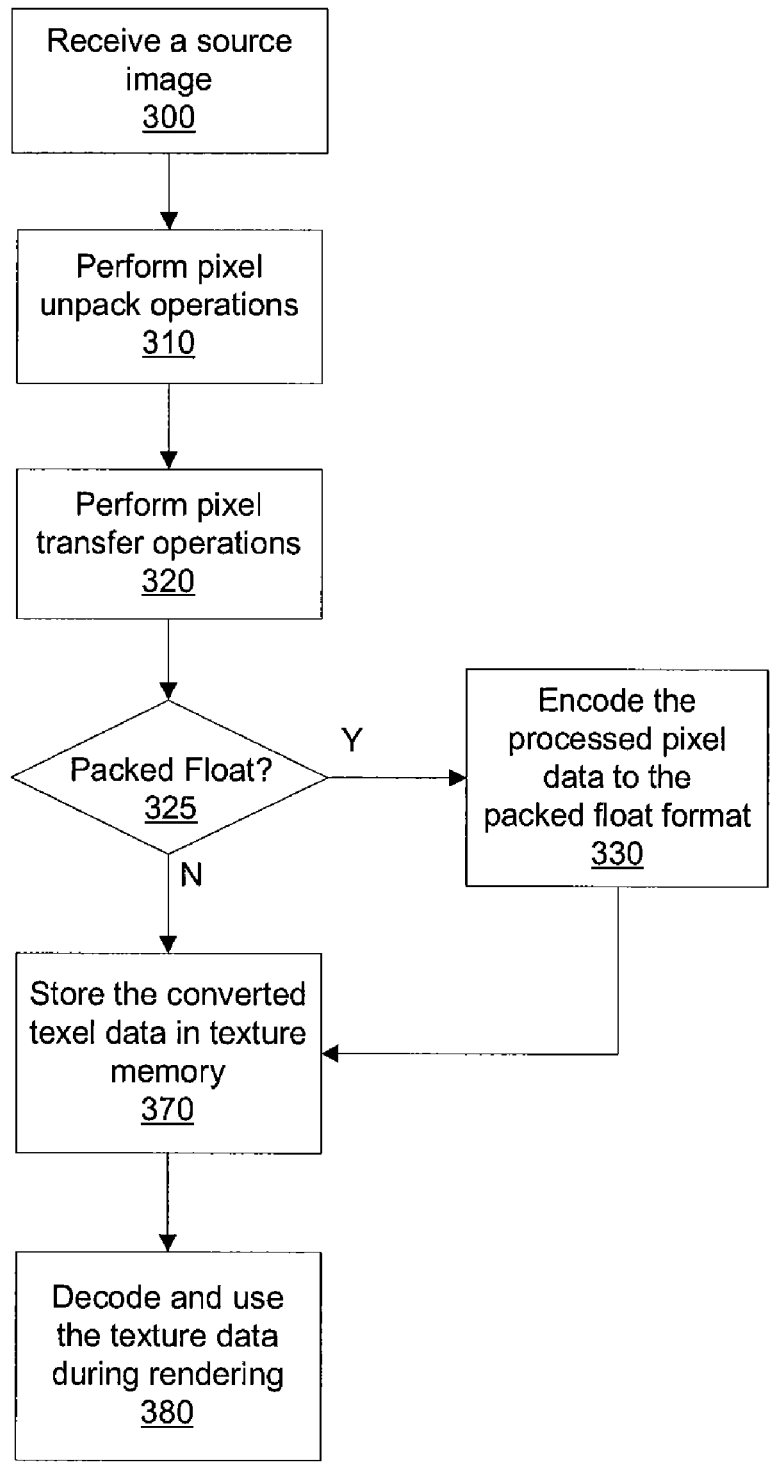
FIG. 3A illustrates a flow diagram of method steps for specifying image data encoded using the packed float format through the pixel processing pipeline of FIG. 2A in accordance with one embodiment of the present invention.

FIG. 3A illustrates a flow diagram of method steps for specifying the packed float format for a source image through pixel processing pipeline 200 of FIG. 2A, in accordance with one embodiment of the present invention. The method shown in FIG. 3A may be used to perform the glTexImage2D OpenGL function to produce texture data in the packed float format. In step 300 pixel unpack engine 205 receives a source image specified by an application. The application may specify that the source image be stored in the packed float format provided by the 3D graphics API extension. In step 310 pixel unpack engine 205 performs pixel unpack operations known to those skilled in the art to produce an array of values representing components of the source image. Note that the source image may be conventional image data, such as color components, or the source image data may be other types of data that are also suitable for use as a texture map, e.g., light intensity, height fields, displacement data, or the like.

In step 320 pixel transfer engine 215 is configured to perform pixel transfer operations on the component values, such as scaling, biasing, matrix operations, convolution, and the like. In particular, pixel transfer engine 215 may be configured to perform data conversions, such as color conversions or floating point to/from fixed point format conversions. In step 325 texture encode engine 220 determines if the packed float format is specified as the output data format for the source image, and, if not, texture encode engine 220 proceeds directly to step 370. Otherwise, in step 330, texture encode engine 220 processes the processed component values to produce packed float texture data, as described in conjunction with FIG. 3B.

In step 370, the texture data is transmitted for storage in texture memory 225 as a texture map. In some embodiments of the present invention, the texture data may be filtered to produce mipmapped texture maps that include two or more level of detail textures for a single source image. In step 380 the texture data is read from texture memory 225 and decoded for use during shading operations.

In a conventional pixel processing pipeline that is not configured to process the packed float format, conversion to the packed float format may be performed by the application before the data is stored for use as a texture map. Including packed float format encoding in the pixel processing pipeline allows for the conversion of pixel components to be performed in the pixel pipeline in addition to the conventional pixel processing pipeline operations provided by pixel unpack engine 205 and pixel transfer engine 215. It is desirable to maintain compatibility with the existing pixel processing pipeline (i.e., existing graphics library functions), while adding the ability to conserve memory space by encoding high dynamic range image data into the packed float format. Furthermore, it is desirable to offload the format conversion processing from the application by performing the format conversion in the pixel pipeline.

Figure 3B:
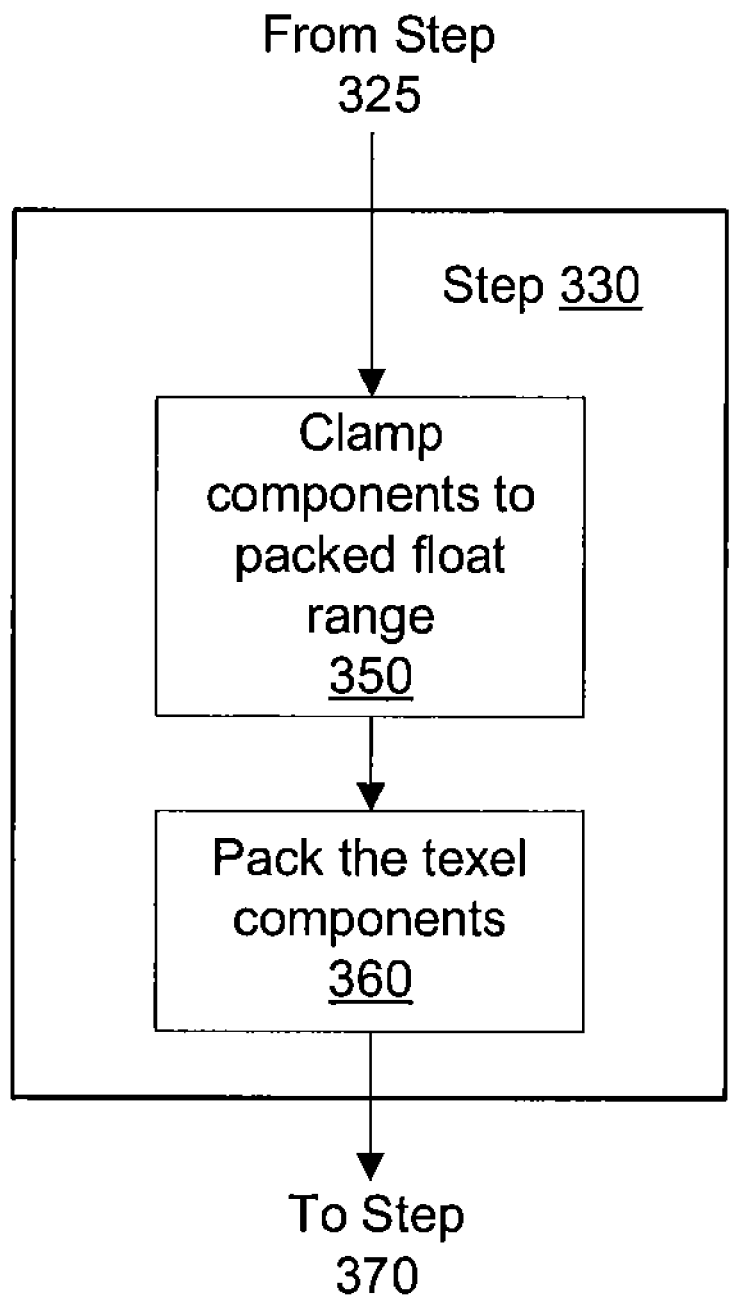
FIG. 3B illustrates a method for encoding image data in accordance with one embodiment of the present invention.

FIG. 3B illustrates an embodiment of a method for encoding image data, as shown in step 330 of FIG. 3A, in accordance with one embodiment of the present invention. In step 350, texture encode engine 220 clamps the components to the packed float range. For example, the equations shown in TABLE 1 may be used to perform step 350, where packedfloat6_max is the maximum value representable using a 5-bit exponent and a 6-bit mantissa, and packedfloat5_max is the maximum value representable by a 5-bit exponent and a 5-bit mantissa.

TABLE 1

| | |
|---|---|
| red_c = | max(0, min(packedfloat6_max, red)) |
| green_c = | max(0, min(packedfloat6_max, green)) |
| blue_c = | max(0, min(packedfloat5_max, blue)) |

In the equations shown above, packedfloat6_max is $(1+63/64) \times 2^{15}$ and packedfloat5_max is $(1+31/32) \times 2^{15}$. If the component values are Infinity or NaN, they are maintained.

In step 360, texture encode engine 220 packs the texel component mantissas and exponents for each texel, and then texture encode engine 220 proceeds to step 370 of FIG. 3A. The 5-bit exponents are stored as unsigned values biased by 15 and there is a 6-bit or 5-bit mantissa for each component. There are no sign bits because all of the components are non-negative due to the clamping in step 350. The mantissas assume an implied one left of the decimal point. To represent the number zero, all exponent bits are assigned zeros and all mantissa bits are assigned zeros. To represent Infinity for any component, all exponent bits are assigned ones and all mantissa bits are assigned zeros. To represent NaN for any component, all exponent bits are assigned ones and the mantissa is assigned a non-zero value. In alternative embodiments of the present invention, both signed and unsigned values may be represented by using 5-bit exponents and 4-bit or 5-bit mantissas that each have a sign bit.

Figure 3C:
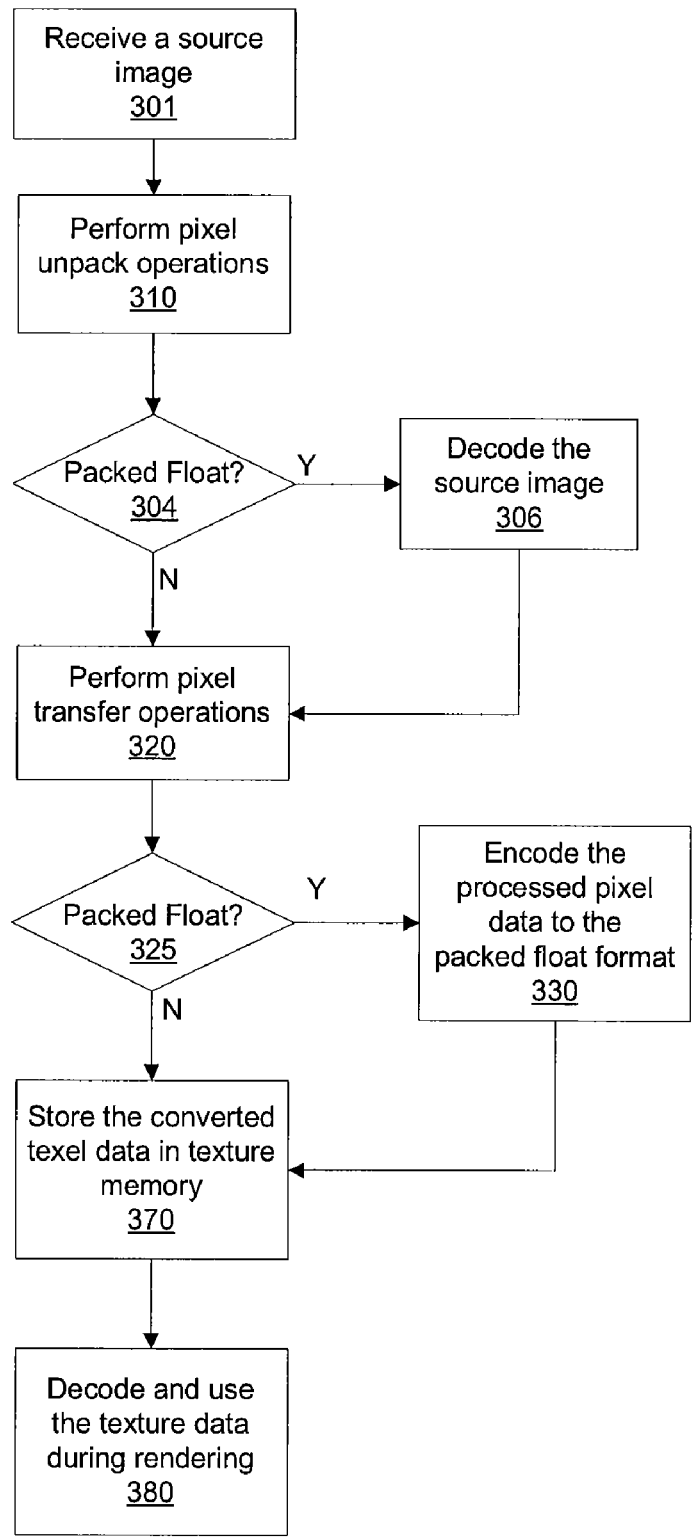
FIG. 3C illustrates a flow diagram of method steps for specifying image data for encoding to or decoding from the packed float format through the pixel processing pipeline of FIG. 2B in accordance with one embodiment of the present invention.

FIG. 3C illustrates a flow diagram of method steps for specifying image data for encoding to or decoding from the packed float format through pixel processing pipeline 250 of FIG. 2B, in accordance with one embodiment of the present invention. The method shown in FIG. 3C may be used to perform the glTexImage2D OpenGL function to decode a source image represented in the packed float format and/or encode texture data into the packed float format while maintaining compatibility with the pixel pipeline functions specified by OpenGL.

In step 301, pixel processing pipeline 250 receives a source image specified by an application. The image is unpacked into pixel components by step 310. The application may specify that the source image is represented in the packed float format provided by the 3D graphics API extension. After unpacking, in step 304, packed float decode engine 230 determines if the source image is represented in the packed float format, and, if not, the source image is transmitted to pixel transfer engine 215. Otherwise, in step 306, packed float decode engine 230 decodes the unpacked source components assumed to be in the packed float format to produce floating point data, which is then transmitted to pixel unpack engine 205. If any component of the source image is represented as NaN or Infinity, the packed float NaN or Infinity value is converted to the corresponding half-precision or full precision NaN or Infinity value, by padding the source image component with 1's or 0's, as needed. The equations shown in TABLE 2 may be used to perform step 306 to compute the decoded component values. The equations shown in TABLE 2 may be used to perform step 306 to compute the component values. The unpacked components red_man, red_exp, green_man, green_exp, blue_man, and blue_exp values are processed as unsigned integers and are decoded to red, green, and blue components. In the preferred embodiment, the bias value, B, is 15.

TABLE 2

| | |
|---|---|
| red = | red_man * $2^{(red\_exp - B)}$ |
| green = | green_man * $2^{(green\_exp - B)}$ |
| blue = | blue_man * $2^{(blue\_exp - B)}$ |

Steps 310, 320, 325, 330, 370, and 380 are completed as previously described in conjunction with FIGS. 3A and 3B.

Figure 4A:
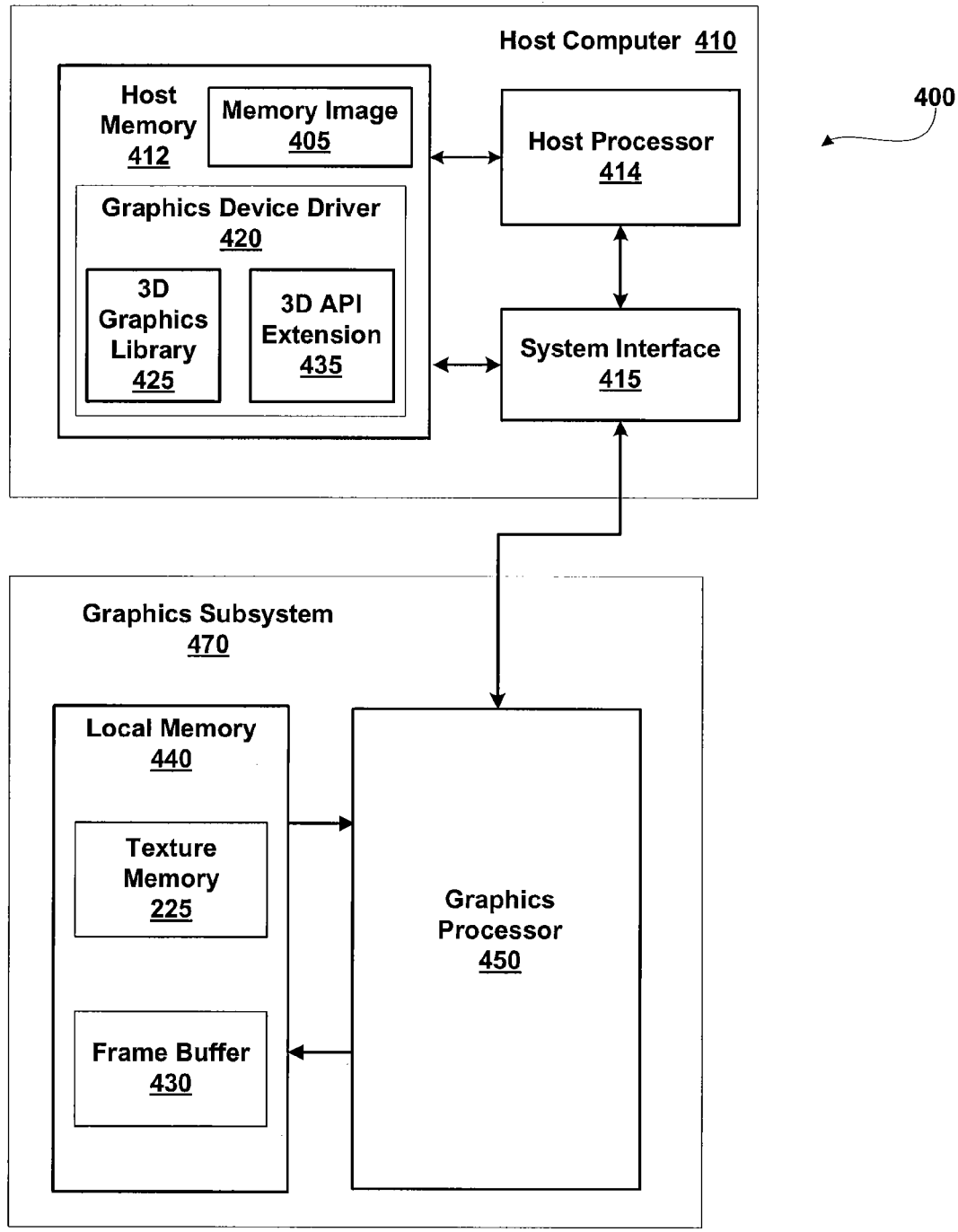
FIG. 4A illustrates a computing system including a host computer and a graphics subsystem in accordance with one embodiment of the present invention.

FIG. 4A illustrates one embodiment of a computing system 400 including a host computer 410 and a graphics subsystem 470, in accordance with one embodiment of the present invention. Computing system 400 may be a desktop computer, server, laptop computer, palm-sized computer, tablet computer, game console, cellular telephone, computer-based simulator, or the like. Host computer 410 includes host processor 414 that may include a system memory controller to interface directly to host memory 412 or may communicate with host memory 412 through a system interface 415. System interface 415 may be an I/O (input/output) interface or a bridge device, including the system memory controller to interface directly to host memory 412.

A graphics device driver 420 is stored in host memory 412 and includes 3D graphics library 425 and 3D API extension 435. Graphics device driver 420 is configured to interface between applications using functions provided by 3D graphics library 425 and 3D API extension 435 and a graphics subsystem 470. Graphics device driver 420 translates instructions for execution by graphics processor 450 based on the specific capabilities of graphics processor 450. In some embodiments of the present invention, graphics device driver 420 is configured to perform instruction format encoding to the internal format specified by the application using graphics processor 450. Offloading the format encoding and decoding to graphics processor 450 may improve the encoding and decoding performance.

3D graphics API extension 435 provides packed float format encode and decode support for 3D graphics library 425. A memory image 405 is stored in host memory 412 for processing using functions provided by 3D graphics library 425 and 3D API extension 435 to produce image data, including component values encoded using the packed float format and/or decoded from the packed float format. Alternatively, the memory image may reside in the local memory 440 (not shown). 3D graphics library 425 provides function calls for graphics processing, including operations performed by pixel unpack engine 205 and pixel transfer engine 215. Likewise, 3D API extension 435 provides the functions of texture encode engine 220 and packed float decode engine 230 for use with 3D graphics library 425.

Host computer 410 communicates with graphics subsystem 470 via system interface 415. Data received by graphics processor 450 can be processed by a graphics pipeline within graphics processor 450 or written to a local memory 440. Graphics processor 450 uses graphics memory to store graphics data and program instructions, where graphics data is any data that is transmitted to or received from units within graphics processor 450. Graphics memory can include portions of host memory 412, local memory 440, register files coupled to the components within graphics processor 450, and the like. Graphics processor 450 includes one or more processing units that may each read and/or write graphics memory. In alternate embodiments, host processor 414, graphics processor 450, system interface 415, or any combination thereof, may be integrated into a single processing unit. Further, the functionality of graphics processor 450 may be included in a chip set or in some other type of special purpose processing unit or co-processor.

In a typical implementation graphics processor 450 performs geometry computations, rasterization, pixel texture mapping and shading computations and raster operations. Texel components provided by pixel processing pipeline 200 or 250 are stored in texture memory 225 within local memory 440. The texel components represented in the packed float format may be read and decoded by graphics processor 450 for use during the execution of graphics processing programs. Specifically, the texture data may be used during the processing of geometry, vertex, or pixel data. Pixel components provided by pixel processing pipeline 200 or 250 are stored in frame buffer 430 within local memory 440. The pixel components represented in the packed float format may be read and decoded by graphics processor 450 for use during the execution of graphics processing programs. In particular, the pixel components may be read during raster operations.

When the data received by graphics subsystem 470 has been completely processed by graphics processor 450, it transmits the processed graphics data to a frame buffer 430 within local memory 440. In particular, source image data that is produced by graphics processor 450 may be stored in frame buffer 430 and provided to pixel processing pipeline 200 or 250 for encoding. Source image data that includes either signed or unsigned components may then be encoded and stored as an encoded texture map in texture memory 225, when texture encode engine 220 is included in pixel processing pipeline 200 or 250. Therefore, image data may be read from frame buffer 430 and provided to pixel processing pipeline 200 or 250 directly without requiring intervention by a graphics application to copy the image data to host memory 412, encode the image data into the packed float format, and copy the encoded image data to the framebuffer 430. As previously described, the functionality of texture encode engine 220 may be provided using 3D API extension 435.

In some embodiments of the present invention, graphics processor 450 is optionally configured to deliver data to a display device, network, electronic control system, other computing system 400, other graphics subsystem 470, or the like. Alternatively, data is transmitted to a film recording device or written to a peripheral device (e.g., a disk drive, tape, compact disk, or the like).

Figure 4B:
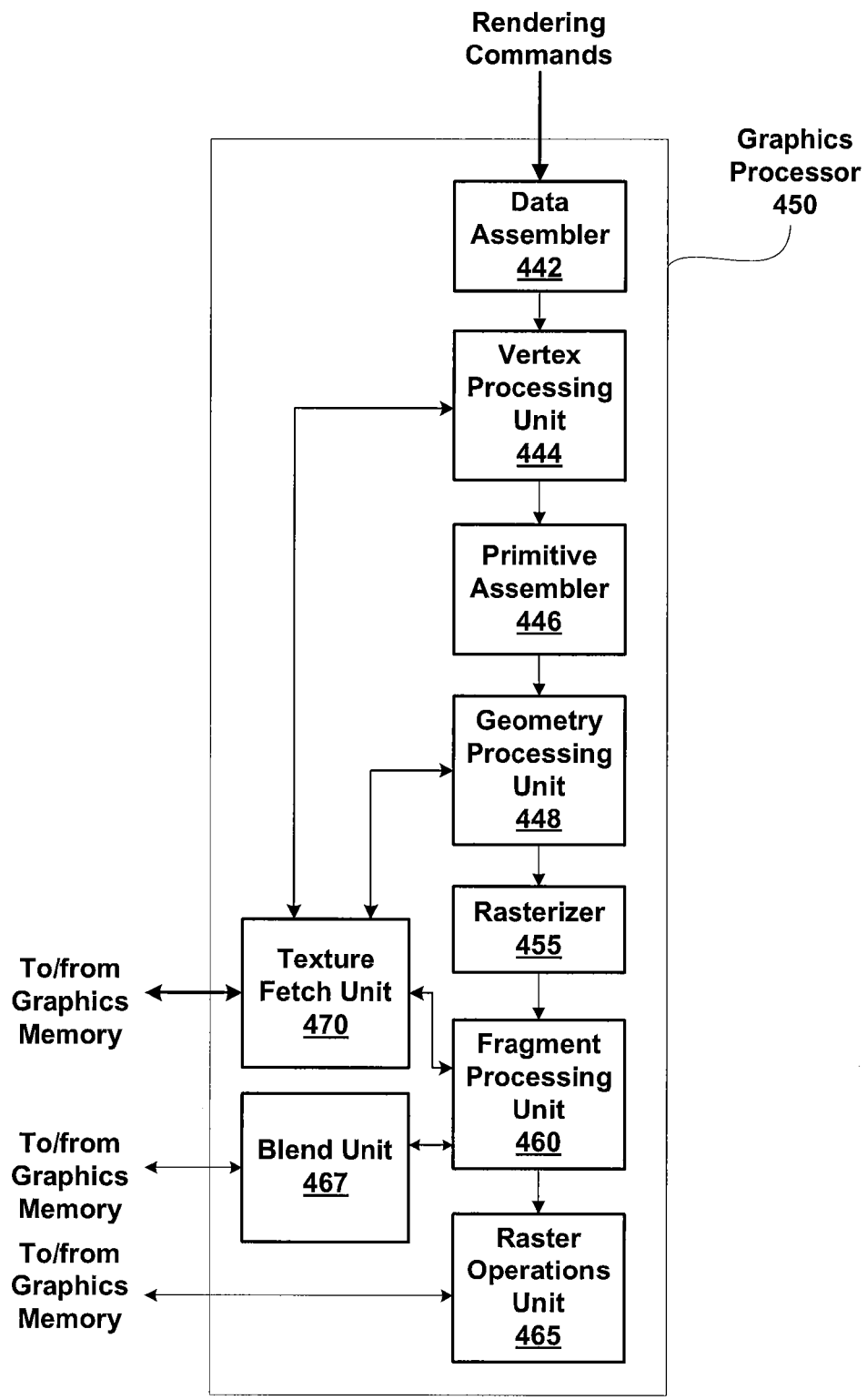
FIG. 4B illustrates the graphics processor of FIG. 4A in accordance with one embodiment of the present invention.

FIG. 4B illustrates the graphics processor of FIG. 4A in accordance with one embodiment of the present invention. Graphics processor 450 includes a data assembler 442, a vertex processing unit 444, a primitive assembler 446, a geometry processing unit 448, a rasterizer 455, a fragment processing unit 460, a raster operations unit 465, a blend unit 467, and a texture fetch unit 470. Data assembler 442 is a fixed function unit that collects vertex data for high-order surfaces, primitives, and the like, and transmits the vertex data to vertex processing unit 444. Vertex processing unit 444 is a programmable execution unit that is configured to execute vertex shader programs to transform the vertex data. For example, vertex processing unit 444 may be programmed to transform the vertex data from an object-based coordinate representation (object space) to an alternatively based coordinate system such as world space or normalized device coordinates ("NDC") space. Vertex processing unit 444 may read texture map data that is stored in local memory 440 through the texture fetch unit 470, for use in processing the vertex data.

Primitive assembler 446 receives processed vertex data from vertex processing unit 444 and constructs graphics primitives (e.g., points, lines, triangles, or the like) to be processed by geometry processing unit 448. Geometry processing unit 448 is a programmable execution unit that is configured to execute geometry shader programs that transform graphics primitives received from primitive assembler 446. For example, geometry processing unit 448 may be programmed to subdivide the graphics primitives into one or more new graphics primitives and calculate parameters, such as plane equation coefficients, that are used to rasterize the new graphics primitives. Geometry processing unit 448 transmits the parameters and new graphics primitives to rasterizer 455. Geometry processing unit 448 may read texture map data that is stored in local memory 440 through the texture fetch unit 470, for use in processing the geometry data.

Rasterizer 455 scan converts the new graphics primitives, as well as transmitting fragments and coverage data to fragment processing unit 460. Fragment processing unit 460 is a programmable execution unit that is configured to execute fragment shader programs that transform fragments received from rasterizer 455. For example, fragment processing unit 460 may be programmed to perform operations such as perspective correction, texture mapping, shading, blending, and the like, to produce shaded fragments that are transmitted to raster operations unit 465. Fragment processing unit 460 may read texture map data that is stored in local memory 440 through texture fetch unit 470, for use in processing the fragment data. Texture fetch unit 470 produces read requests for texels, decodes texel components represented in the packed float format, and performs texture filtering operations (e.g., bilinear, trilinear, anisotropic, and the like), as described in conjunction with FIG. 4C. Raster operations unit 465 is a fixed function unit that optionally performs near and far plane clipping and raster operations, such as stencil, z test, and the like, and transmits pixel data as processed graphics data for storage in graphics memory.

Figure 4C:
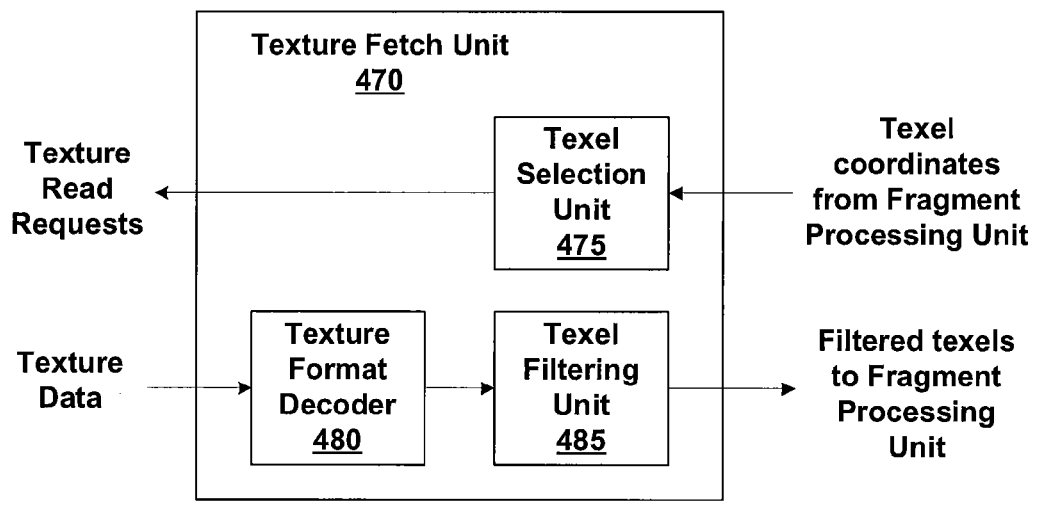
FIG. 4C illustrates the texture fetch unit of FIG. 4B in accordance with one embodiment of the present invention.

FIG. 4C illustrates texture fetch unit 470 of FIG. 4B, in accordance with one embodiment of the present invention. Texture fetch unit 470 includes a texel selection unit 475, a texture format decoder 480, and a texture filtering unit 485. Texture selection unit 475 determines which texels should be read based on the texture map coordinates and computes the addresses for read requests. Texture format decoder 480 receives the texture data for the texels and decodes the components that are represented in the packed float format to expand each component to a fixed-point representation or floating-point representation with an exponent for each component. Texture format decoder 480 may also be configured to perform other format conversions (e.g., float to integer, decompression, or the like).

Texture filtering unit 485 receives the converted texture data and performs point sampling, bilinear filtering, trilinear filtering, or anisotropic filtering to produce filtered texel values that are transmitted to fragment processing unit 460. In some embodiments of the present invention, additional texture fetch units 470 are coupled to other processing units within graphics processor 450, such as vertex processing unit 444 and geometry processing unit 448, to allow those units to read texture data for processing.

Figure 4D:
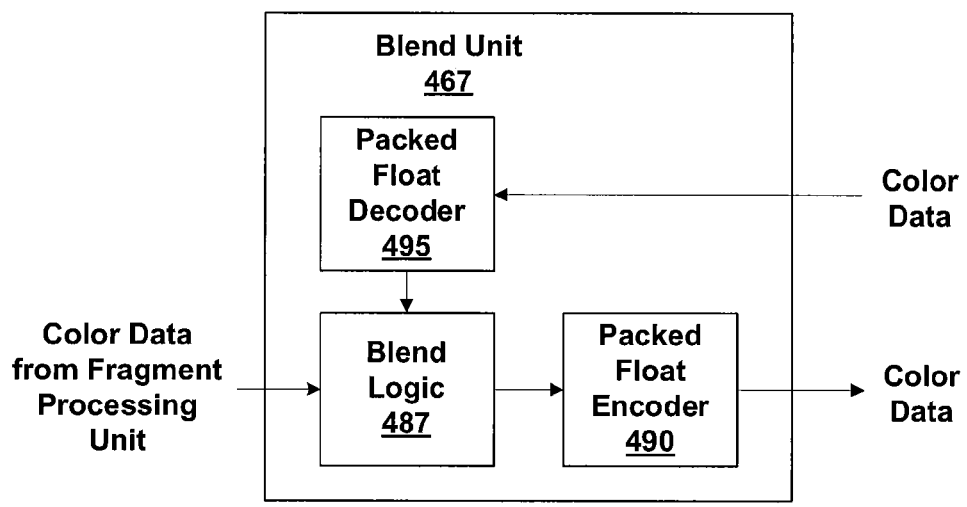
FIG. 4D illustrates the blend unit of FIG. 4B in accordance with one embodiment of the present invention.

FIG. 4D illustrates blend unit 467 of FIG. 4B, in accordance with one embodiment of the present invention. Blend unit 467 includes blend logic 487, a packed float encoder 490 and a packed float decoder 495. Blend logic 487 blends pixel color data from the fragment processing unit, referred to as "source pixel color data," with pixel color data stored in the framebuffer, referred to as "destination pixel color data," to form blended color pixels that are stored in the framebuffer. Packed float decoder 495 receives the destination color data to be blended from the framebuffer and decodes the components that are represented in the packed float format to expand each component to a fixed-point representation or floating-point representation required by the blend logic 487. Packed float encoder 490 receives the blended color data produced by blend logic 487 and encodes it into packed float format before storing the blended color data into the framebuffer 430.

Figure 5:
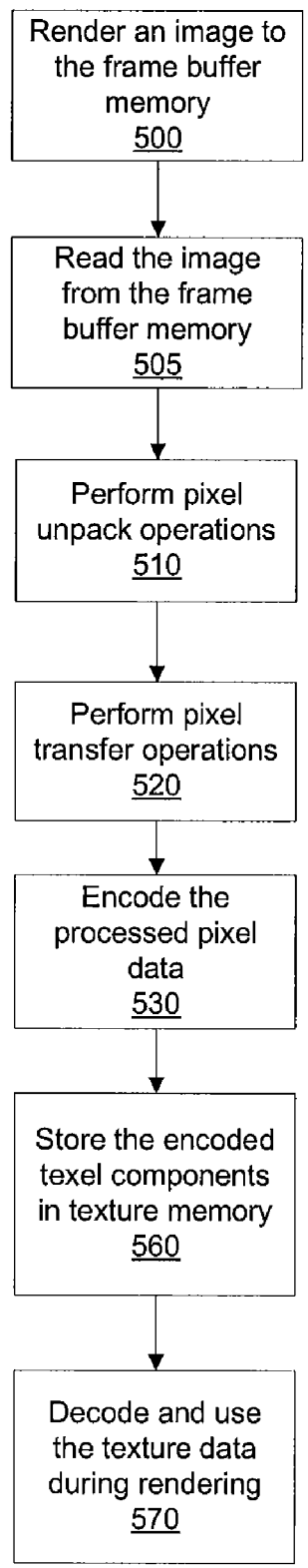
FIG. 5 illustrates another flow diagram of method steps for specifying packed float format textures through the pixel processing pipeline of FIG. 2A or 2B in accordance with one embodiment of the present invention.

FIG. 5 illustrates another flow diagram of method steps for specifying image data in a packed float format through pixel processing pipeline 200 or 250 of FIGS. 2A and 2B, in accordance with one embodiment of the present invention. The method shown in FIG. 5 may be used to perform the glCopyTexImage OpenGL function to copy a source image to a texture that is represented in the packed float format while maintaining compatibility with the pixel pipeline functions specified by OpenGL.

In step 500 graphics processor 450 renders an image and stores the image in frame buffer 430 of local memory 440. The image may be specified using 3D graphics library 425 as a source image for processing by pixel processing pipeline 200. For example, a pointer to a memory location in frame buffer 430 may be provided along with a source format. A destination location within texture memory 225 may be specified with a destination (internal) format as provided by 3D API extension 435 for packed float format texture components. In step 505, pixel processing pipeline 200 reads the image for processing as a source image from frame buffer 430. Steps 510, 520, 530, 560 and 570 correspond to steps 310, 320, 330, 370, and 380 of FIG. 3A, respectively, and are performed as previously described to produce texel components in packed float format for storage in texture memory 225 and use during rendering.

Figure 6A:
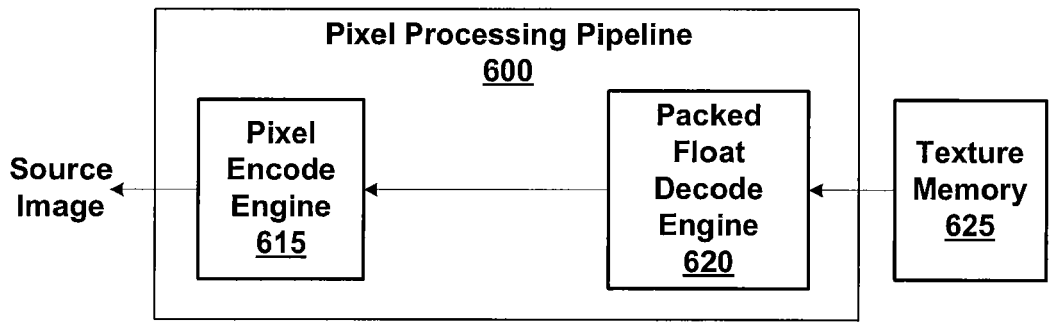
FIG. 6A is a block diagram illustrating another pixel processing pipeline including an encoding and a decoding engine in accordance with one embodiment of the present invention.

FIG. 6A is a block diagram illustrating another pixel processing pipeline, pixel processing pipeline 600, that includes a pixel encode engine 615 and a packed float decode engine 620, in accordance with one embodiment of the present invention. Pixel processing pipeline 600 may be used to perform the glGetTexImage OpenGL function to read a texture stored in the packed float format and convert the texture into another format. Texture data represented in the packed float format is read from texture memory 625 by pixel processing pipeline 600. Packed float decode engine 620 is configured to decode the components represented in the packed float format and produce expanded texture components. Pixel encode engine 615 is configured to encode texture components that are not represented in the packed float format into the packed float format and transmit the encoded texture components as a source image, for storage in a portion of host memory 412 allocated to an application or frame buffer 430.

Pixel processing pipeline 600 may be used in various texture image query modes to encode/decode texture data to/from the packed float format. For example, a texture map represented in the packed float format may be read and decoded to a fixed-point format or conventional floating-point format. Conversely, a texture map represented in a fixed-point or conventional floating-point format may be read and encoded to the packed float format. Pixel processing pipeline 600 may also be used to perform an optimized memory-to-memory transfer in order to copy a texture map encoded in the packed float format to a source image encoded in the packed float format.

Figure 6B:
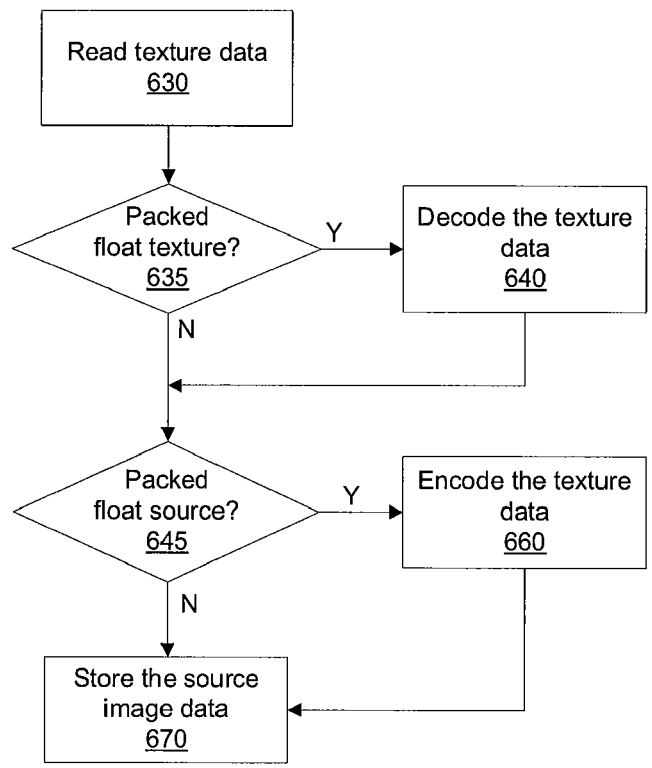
FIG. 6B illustrates another flow diagram of method steps for specifying packed float format textures through the pixel processing pipeline of FIG. 6A in accordance with one embodiment of the present invention.

FIG. 6B illustrates another flow diagram of method steps for specifying packed float format textures through the pixel processing pipeline 600 of FIG. 6A, in accordance with one embodiment of the present invention. The method shown in FIG. 6B may be used to perform the glGetTexImage OpenGL function to copy to a destination memory image from a texture when both the destination image and texture may or may not be encoded in the packed float format while maintaining compatibility with the texture query behavior specified by OpenGL.

In step 630, pixel processing pipeline 600 reads the texture data from texture memory 625. In step 635, packed float decode engine 620 determines if the texture data is represented in the packed float format. If so, in step 640, packed float decode engine 620 decodes the texture data, transmits the decoded texture data to pixel encode engine 615, and proceeds to step 645. If, in step 635, packed float decode engine 620 determines that the texture data is not represented in the packed float format, packed float decode engine 620 transmits the texture data to pixel encode engine 615.

In step 645, pixel encode engine 615 determines if the packed float format is specified for the destination image. If so, in step 660, the texture data or decoded texture data received from packed float decode engine 620 is encoded into the packed float format and transmitted as the destination image data by pixel encode engine 615. If, in step 645, pixel encode engine 615 determines that the packed float format is not specified for the source image, pixel encode engine 615 transmits the texture data or decoded texture data as the source image data. In step 670, the destination image data transmitted by pixel encode engine 615 is stored in a portion of host memory 412 allocated to an application or local memory 440. In some embodiments of the present invention, when the packed float format is specified for the texture data and the source image, pixel processing pipeline 600 is configured in a pass-through mode and the texture data is transferred without changing the format.

Figure 7A:
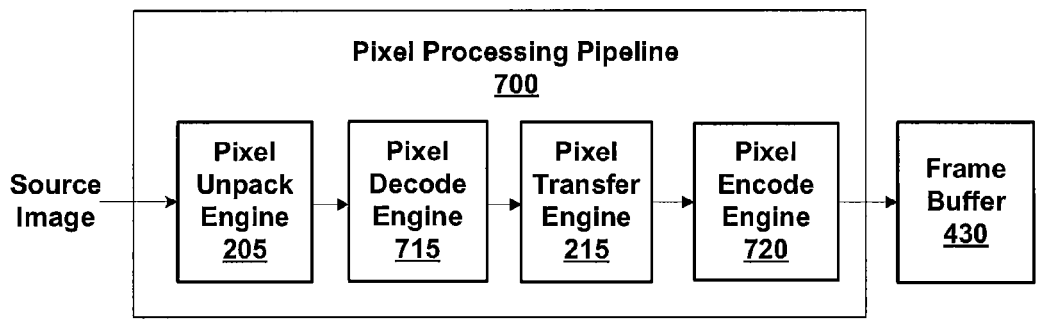
FIG. 7A is a block diagram illustrating another pixel processing pipeline including an encoding and a decoding engine in accordance with one embodiment of the present invention.

FIG. 7A is a block diagram illustrating another pixel processing pipeline, pixel processing pipeline 700, that includes a pixel encode engine 720 and a pixel decode engine 715, in accordance with one embodiment of the present invention. Pixel processing pipeline 700 may be used to perform the glDrawPixels OpenGL function to write pixels encoded in the packed float format to the frame buffer 430. In particular, pixel processing pipeline 700 may be used to encode a high dynamic range source image represented in a conventional floating point format into the compact packed float format. The source image is transmitted to pixel processing pipeline 700 and unpacked by pixel unpack engine 205. Then, pixel decode engine 715 is configured to decode the source image into another format as needed for processing by pixel transfer engine 215. In some embodiments of the present invention, pixel decode engine 715 is configured to decode the components represented in the packed float format and produce texture components represented in a conventional format (e.g., half-precision or full precision floating point). In other embodiments of the present invention, pixel decode engine 715 may be bypassed and the source image may be provided by the application in a format that can be processed by pixel transfer engine 215.

Pixel unpack engine 205 and pixel transfer engine 215 process the decoded source image and produce processed source image components. Pixel encode engine 720 is configured to convert processed source image components that are not represented in the packed float format into the packed float format, and to transmit the converted components for storage in frame buffer 430.

Figure 7B:
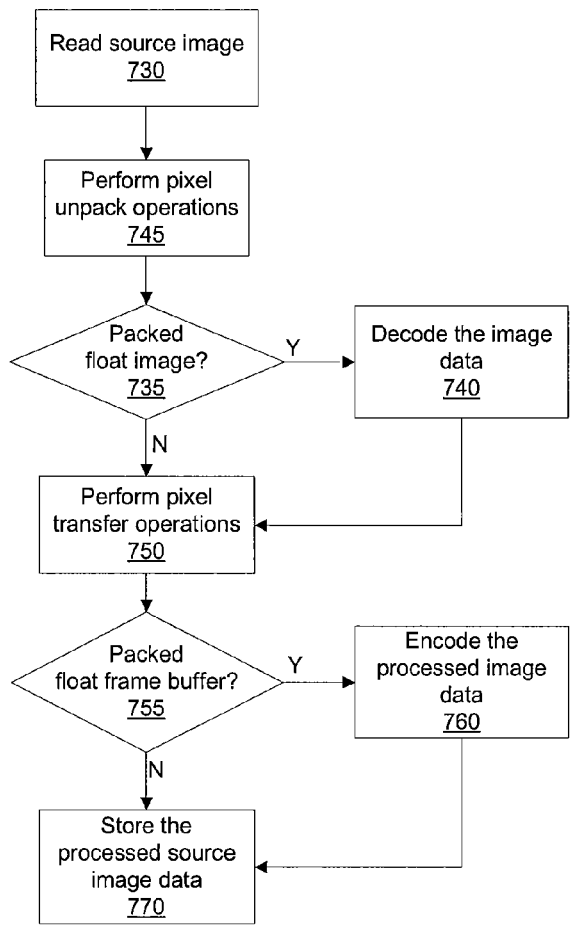
FIG. 7B another flow diagram of method steps for specifying packed float format images through the pixel processing pipeline of FIG. 7A in accordance with one embodiment of the present invention.

FIG. 7B illustrates another flow diagram of method steps for specifying packed float format images through pixel processing pipeline 700 of FIG. 7A, in accordance with one embodiment of the present invention. The method shown in FIG. 7B may be used to perform the glDrawPixels OpenGL function to convert a source image to the packed float format while maintaining compatibility with the pixel pipeline functions specified by OpenGL.

In step 730, pixel processing pipeline 700 reads the source image data from a location in graphics memory specified by a function call. The data is unpacked into components by step 745. In step 735, pixel decode engine 715 determines if the source image is encoded in the packed float format. If so, in step 740, pixel decode engine 715 decodes the source image data, transmits the decoded source image data to pixel transfer engine 215, and proceeds to step 750. If, in step 735, pixel decode engine 715 determines that the source image is not encoded in the packed float format, pixel decode engine 715 transmits the source image to pixel unpack engine 205.

In step 750, pixel transfer engine 215 performs pixel transfer operations on the decoded source image data. In step 755, pixel encode engine 720 determines if the destination image is specified to be stored in packed float format within frame buffer 430. If so, in step 760, the processed source image data received from pixel transfer engine 215 is encoded into the packed float format and transmitted as the destination image data by pixel encode engine 720. If, in step 755, pixel encode engine 720 determines that the packed float format is not specified for the destination image, pixel encode engine 720 transmits the processed source image data as the destination image data. In step 770, the destination image data transmitted by pixel encode engine 720 is stored in frame buffer 430. In some embodiments of the present invention, when the packed float format is specified for the source image data and the destination image, pixel processing pipeline 700 is configured in a pass-through mode and the source image data is transferred without changing the format.

Figure 8A:
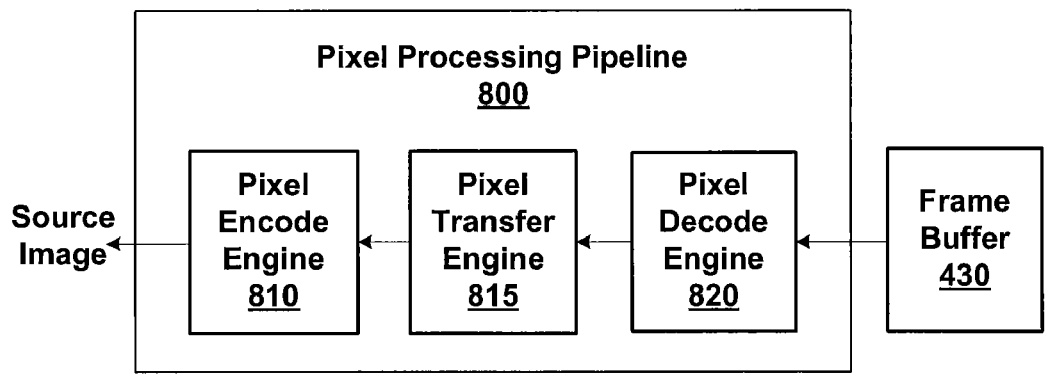
FIG. 8A is a block diagram illustrating another pixel processing pipeline including an encoding and a decoding engine in accordance with one embodiment of the present invention.

FIG. 8A is a block diagram illustrating another pixel processing pipeline, pixel processing pipeline 800, that includes a pixel encode engine 810, a pixel transfer engine 815 and a pixel decode engine 820, in accordance with one embodiment of the present invention. Pixel processing pipeline 800 may be used to perform the glReadPixels OpenGL function to read pixels from frame buffer 430 and convert the pixels into the packed float format. In particular, pixel processing pipeline 800 may be used to convert a high dynamic range image rendered into frame buffer 430 from a conventional floating point format to the compact packed float format. The rendered image is provided to pixel processing pipeline 800, and pixel decode engine 820 is configured to decode the rendered image into another format, as needed, for processing by pixel transfer engine 815. In some embodiments of the present invention, pixel decode engine 820 is configured to decode the components from the packed float format to the conventional format.

Pixel transfer engine 815 processes the decoded rendered image and produces processed rendered image components.

Pixel encode engine 810 is configured to encode processed rendered image components that are not represented in the packed float format into the packed float format and to transmit the encoded components as a source image. In some embodiments of the present invention, pixel encode engine 810 is configured to decode the processed rendered image components into conventional fixed-point or floating-point data formats, in addition to the packed float format.

Figure 8B:
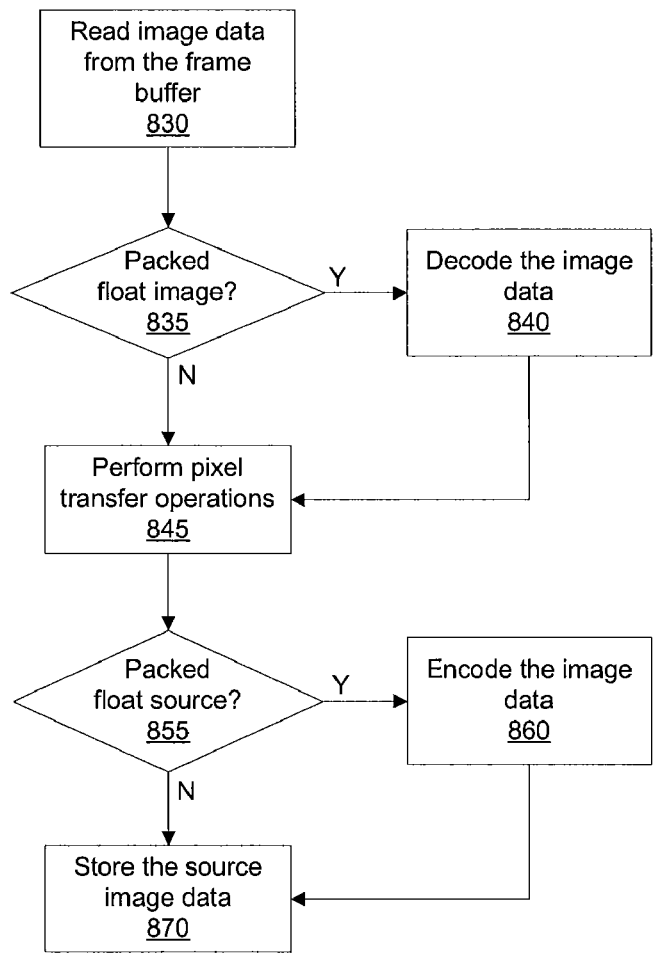
FIG. 8B illustrates another flow diagram of method steps for specifying packed float format images through the pixel processing pipeline of FIG. 8A in accordance with one embodiment of the present invention.

FIG. 8B illustrates another flow diagram of method steps for specifying packed float format images through pixel processing pipeline 800 of FIG. 8A, in accordance with one embodiment of the present invention. The method shown in FIG. 8B may be used to perform the glReadPixels OpenGL function to convert a rendered image to a source image that is represented in the packed float format, while maintaining compatibility with the pixel pipeline functions specified by OpenGL.

In step 830, pixel processing pipeline 800 reads the rendered image data from a location in frame buffer 430 specified by a function call. In step 835, pixel decode engine 820 determines if the rendered image is encoded in the packed float format. If so, in step 840, pixel decode engine 820 decodes the rendered image data, transmits the decoded rendered image data to pixel transfer engine 815, and proceeds to step 845. If, in step 835, pixel decode engine 820 determines that the rendered image is not encoded in the packed float format, pixel decode engine 820 transmits the rendered image to pixel transfer engine 815 without decoding the rendered image data.

In step 845 pixel transfer engine 815 performs pixel transfer operations on the rendered image data or decoded rendered image data to produce processed image data. In step 855 pixel encode engine 810 determines if the source image is specified to be stored in packed float format within a portion of host memory 412 that is allocated to the application. If so, in step 860, the processed image data received from pixel transfer engine 815 is encoded into the packed float format and transmitted as the source image data by pixel encode engine 810. If, in step 855, pixel encode engine 810 determines that the source image is not specified to be stored in packed float format, pixel encode engine 810 transmits the processed image data as the source image data. In step 870, the source image data transmitted by pixel encode engine 820 is stored in host memory 412. In some embodiments of the present invention, when the packed float format is specified for the rendered image data and the source image, pixel processing pipeline 800 is configured in a pass-through mode and the rendered image data is transferred without changing the format.

Figure 9:
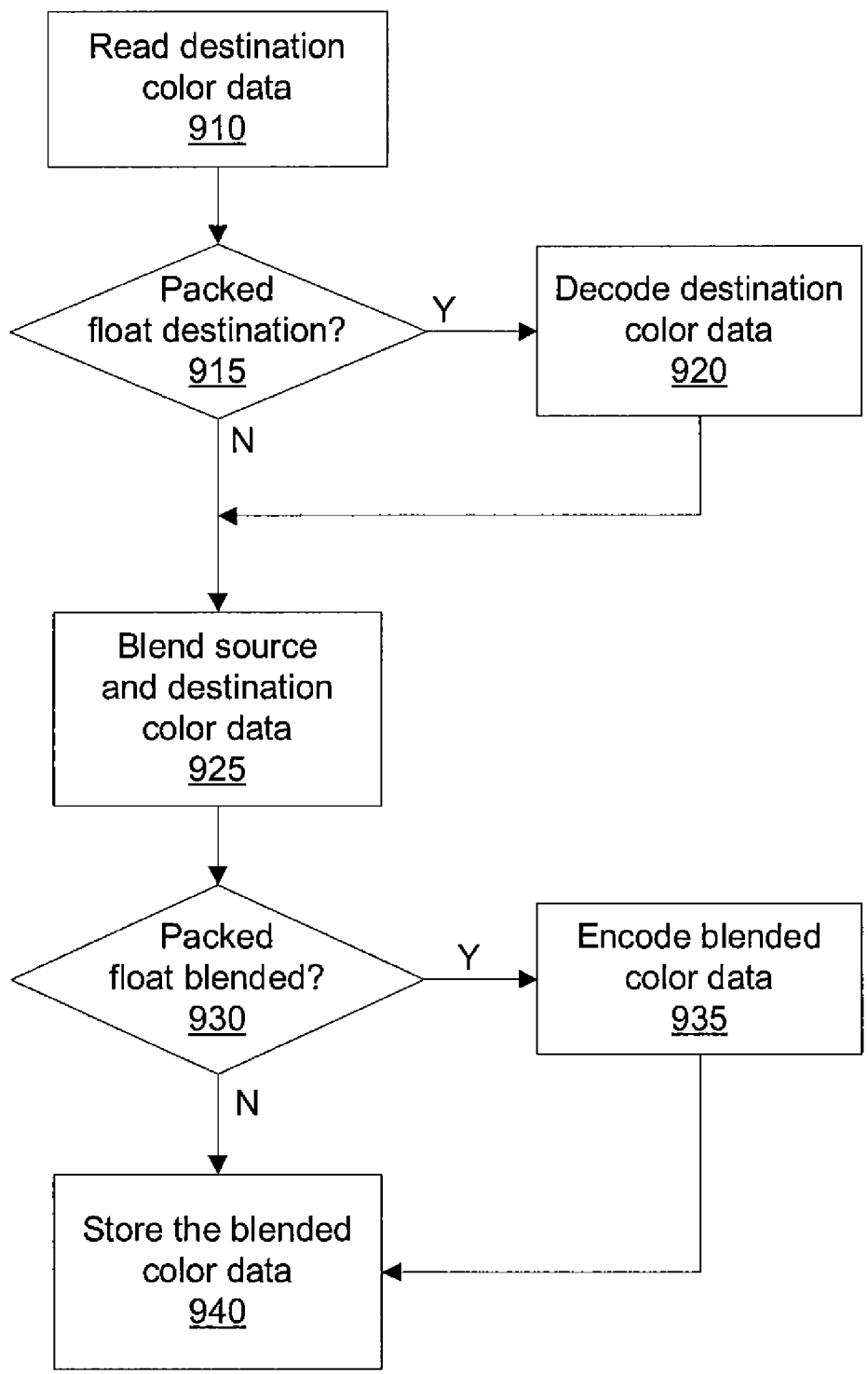
FIG. 9 illustrates a flow diagram of method steps for carrying out pixel blending in accordance with one embodiment of the present invention.

FIG. 9 illustrates a flow diagram of method steps for carrying out pixel blending by the blend unit 467 of FIG. 4D, in accordance with one embodiment of the present invention. In step 910, blend unit 467 reads the destination color data from the frame buffer 430. In step 915, packed float decoder 495 determines if the destination color data is encoded in the packed float format. If so, in step 920, packed float decoder 495 decodes the destination color data, transmits the expanded destination color data to blend logic 487, and the method proceeds to step 925. If, in step 915, packed float decoder 495 determines that the destination color data is not encoded in packed float format, the method proceeds directly to step 925.

In step 925, blend logic 487 blends the destination color data with the source color data to form blended color data. In step 930, packed float encoder 490 determines if the blended color data to be stored in the framebuffer 430 is specified to be stored in packed float format. If so, in step 935, the blended color data is encoded into the packed float format and transmitted as the blended color data by packed float encoder 490. If, in step 930, packed float encoder 490 determines that the blended color data to be stored in the framebuffer 430 is not specified to be stored in packed float format, the method proceeds directly to step 940. In step 940, the blended color data transmitted by packed float encoder 490 is stored in the frame buffer 430.

According to embodiments of the present invention, high dynamic range image data may be stored in the compact packed float format provided by the 3D graphics API extension while requiring less memory than conventional floating point formats that are typically used to represent high dynamic range data. Furthermore, using a 3D graphics API extension to add support for the packed float format maintains compatibility with existing pixel processing while adding the ability to conserve memory space. The 3D graphic API extension allows for an application to provide an image in a conventional format without requiring the application to perform the encoding to the packed float format or the decoding from the packed float format. Therefore, applications may seamlessly specify the new packed float format for image data and save memory space needed to store the image while maintaining the capability to execute conventional graphics library function calls. Applications may also pre-encode image data in the packed float format and specify a different format or the packed float format for the destination (internal format).

Therefore, the packed float format using a 5-bit exponent represents nearly the same range of finite values as the half-precision floating point format specified by the ARB_texture_float extension. However, the half-precision floating point format requires 48 bits for three components while the packed float format requires only 32 bits. Therefore, the packed float format is more compact than the half-precision floating point format while maintaining nearly the same precision. It is advantageous to store image data in the packed float format since the image data will require less memory compared with the half-precision floating point format or a conventional floating point format with 32 bits per component.

Persons skilled in the art will appreciate that any system configured to perform the method steps of FIG. 3A, 3B, 3C, 5, 6B, 7B, 8B or 9, or their equivalents, are within the scope of the present invention. A three dimensional (3D) graphics applications programming interface (API) extension provides support for specifying images in a packed float format. The packed float format is used to represent high dynamic range textures in a compact encoding to reduce the memory footprint needed to store the image data compared with other high dynamic range formats. Image data is encoded to and decoded from the packed float format using the pixel processing pipeline. Image data encoded into the packed float format can be decoded and used as texture data during rendering.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for providing image data represented in a packed float format for graphics processing, comprising:

receiving source image data specified by an application program and a parameter that specifies the packed float format;

processing the source image data using a pixel processing pipeline provided by function calls of a 3D graphics library to produce processed source image data;

clamping components of the processed source image data to a range of the packed float format, wherein all negative values are clamped to zero;

encoding the processed source image data into the packed float format to produce the image data represented in the packed float format; and transmitting the image data represented in the packed float format to a graphics memory for storage, wherein the packed float format represents three color components each having an exponent size of 5 bits and a mantissa size of either 5 bits or 6 bits.

2. The method of claim 1, further comprising storing the image data represented in the packed float format in a texture memory.

3. The method of claim 2, further comprising:
reading a texel represented in the packed float format from the image data stored in the texture memory; and
decoding the texel to produce expanded components for the graphics processing.

4. The method of claim 1, further comprising reading the source image data from a frame buffer memory for input to the pixel processing pipeline.

5. The method of claim 4, further comprising:
rendering graphics data to produce the source image data; and
storing the source image data in the frame buffer memory.

6. The method of claim 1, further comprising:
storing the image data represented in the packed float format in the graphics memory;
reading a portion of the image data represented in the packed float format from the graphics memory; and
decoding the portion of the image data represented in the packed float format to produce an expanded portion of the image data.

7. The method of claim 1, wherein the packed float format is provided by to a programming interface based on the OpenGL graphics system.

8. The method of claim 1, further comprising storing the image data represented in the packed float format in a frame buffer memory.

9. A computing system for providing image data represented in a packed float format for graphics processing, comprising:
a graphics memory configured to store the image data represented in the packed float format;
a software driver configured to:
receive source image data specified by an application program and a parameter that specifies the packed float format;
convert source image data to the packed float format to produce the image data including clamping components of the processed source image data to a range of the packed float format, wherein all negative values are clamped to zero;
transmit the image data represented in the packed float format to the graphics memory for storage; and
a graphics processor configured to read the image data from the graphics memory or write the source image data during the graphics processing,
wherein the packed float format represents three color components each having an exponent size of 5 bits and a mantissa size of either 5 bits or 6 bits.

10. The computing system of claim 9, further comprising a texture memory portion of the graphics memory that is coupled to the graphics processor and configured to store the image data represented in the packed float format.

11. The computing system of claim 10, wherein the graphics processor includes a texture fetch unit that is configured to decode the image data to produce expanded image data for use during shading operations.

12. The computing system of claim 10, wherein the software driver is further configured to read a portion of the image data from the texture memory and decode the portion of the image data to produce an expanded portion of the image data.

13. The computing system of claim 9, further comprising a frame buffer memory portion of the graphics memory that is coupled to the graphics processor and configured to store data in the packed float format.

14. The computing system of claim 13, wherein the graphics processor is further configured to render graphics data to produce the source image data and store packed float formatted data in the frame buffer.

15. The computing system of claim 9, wherein the packed float format is provided by to a programming interface based on the OpenGL graphics system.

16. A non-transitory computer readable medium storing instructions for causing a processor to provide texture data for graphics processing by performing the steps of:
receiving source image data specified by an application program and a parameter that specifies a packed float format;
processing the source image data using a pixel processing pipeline provided by function calls of a 3D graphics library to produce processed source image data;
clamping components of the processed source image data to a range of the packed float format, wherein negative values are clamped to zero;
encoding the processed source image data into the packed float format to produce the image data represented in the packed float format; and
transmitting the image data represented in the packed float format to a graphics memory for storage,
wherein the packed float format represents three color components each having an exponent size of 5 bits and a mantissa size of either 5 bits or 6 bits.

17. The method of claim 1, wherein the packed float format represents infinity as five ones for an exponent and all zeros for a mantissa.

18. The computing system of claim 9, wherein the packed float format represents infinity as five ones for an exponent and all zeros for a mantissa.

19. The computer-readable medium of claim 16, wherein the packed float format represents infinity as five ones for an exponent and all zeros for a mantissa.

20. The method of claim 1, wherein the packed float format represents "Not a Number" (NaN) as five ones for an exponent and at least one non-zero bit in a mantissa.

21. The computing system of claim 9, wherein the packed float format represents "Not a Number" (NaN) as five ones for an exponent and at least one non-zero bit in a mantissa.

22. The computer-readable medium of claim 16, wherein the packed float format represents "Not a Number" (NaN) as five ones for an exponent and at least one non-zero bit in a mantissa.

* * * * *